(12) United States Patent
Klassen

(10) Patent No.: US 7,872,767 B2
(45) Date of Patent: Jan. 18, 2011

(54) PARALLEL PRINTING SYSTEM

(75) Inventor: R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 2076 days.

(21) Appl. No.: 10/407,564

(22) Filed: Apr. 4, 2003

(65) Prior Publication Data

US 2004/0196496 A1    Oct. 7, 2004

(51) Int. Cl.
G06F 3/12 (2006.01)
G06F 15/00 (2006.01)
G06K 1/00 (2006.01)

(52) U.S. Cl. .................... 358/1.15; 358/1.4; 358/1.9

(58) Field of Classification Search ............. 358/1.1, 358/1.9, 1.11–1.18, 296, 1.19; 718/105
See application file for complete search history.

(56) References Cited

U.S. PATENT DOCUMENTS

| | | | | |
|---|---|---|---|---|
| 5,287,194 | A * | 2/1994 | Lobiondo | 358/296 |
| 5,819,014 | A | 10/1998 | Cyr et al. | |
| 5,859,711 | A | 1/1999 | Barry et al. | |
| 6,100,998 | A * | 8/2000 | Nagao et al. | 358/1.9 |
| 6,441,919 | B1 * | 8/2002 | Parker et al. | 358/1.18 |
| 6,825,943 | B1 * | 11/2004 | Barry et al. | 358/1.15 |
| 2003/0184799 | A1 * | 10/2003 | Ferlitsch | 358/1.15 |
| 2004/0114170 | A1 * | 6/2004 | Christiansen et al. | 358/1.13 |
| 2004/0190014 | A1 * | 9/2004 | Ferlitsch | 358/1.5 |
| 2004/0196493 | A1 * | 10/2004 | Christiansen et al. | 358/1.15 |
| 2004/0196495 | A1 * | 10/2004 | Christiansen | 358/1.15 |

FOREIGN PATENT DOCUMENTS

EP    0 860 769    8/1998

OTHER PUBLICATIONS

Brochure, Adobe® PostScript® Extreme™, "Abode Solutions for Commercial Printing", 1998 Abode System Incorporated, pp. 1-8.
European Search Report Dated Dec. 4, 2008, 3 pages, for Xerox Corporation Application No. EP 04 00 8237.

* cited by examiner

Primary Examiner—Thierry L Pham
(74) Attorney, Agent, or Firm—Fay Sharpe LLP

(57) ABSTRACT

A printing system comprised of a printer, a plurality of processing nodes, each processing node being disposed for processing a portion of a print job into a printer dependent format, and a processing manager for spooling the print job into selectively sized chunks and assigning the chunks to selected ones of the nodes for parallel processing of the chunks by the processing nodes into the printer dependent format. The chunks are selectively sized from at least one page to an entire size of the print job in accordance with predetermined splitting factors for enhancing printer printing efficiency.

19 Claims, 3 Drawing Sheets

PARALLEL PRINTING SYSTEM

FIELD OF THE INVENTION

The subject invention relates to printing systems, their architecture and processing steps and, more particularly, to producing electronic images in a manner to drive digital printers more efficiently and faster.

BACKGROUND OF THE INVENTION

Generating print-ready documents to be printed by a printing system involves acquiring the information (content, graphics, production specs, etc.) required to view, process and output the desired document in an electronic form understandable by a print engine. Such systems can range from those that are simple and modestly expensive such as are well known to consumer users of personal computer systems, up to commercial printing systems that are capable of generating in the range of one hundred pages per minute in full color. All systems though have a high level objective of printing faster. There are three general approaches which have been applied in the past for accomplishing this objective. First, faster serial processing methods suggest optimizing the software and using faster and more expensive processors. Second, job parallel processing sends separate jobs to separate systems and then prints them on a common printer. Third, Portable Document Format ("PDF") based page parallel systems convert the job to PDF, and then split the PDF file into pages which are converted to print ready form on multiple independent processors, with the job being printed on a common printer. Software optimization has its limits and faster processors are also limited by currently available technology. Job parallel processing results in poor single job performance, unpredictable job time and reduced throughput when there is only one long job in the queue. The existing PDF-based solutions are slow due to their need to often convert from a different input language into PDF and then write the PDF file into an input spool disk. Page parallel processing has suffered from the inefficiencies of a throughput disadvantage because per job overhead occurs on a per page basis.

A more detailed description of a job parallel system is in U.S. Pat. No. 5,819,014 which describes a printer architecture using network resources to create a "distributed" printer controller or translator. By distributing the translators across the network, print jobs may be processed in parallel. Each job is formatted in the system in a particular data type comprising a Page Description Language ("PDL") such as a PostScript file, ASCII, PCL, etc. A distributed set of the translators is used for each data type, the translators each comprising a plurality of CPUs to simultaneously rasterize each data type. In real time operation, each translator on the network can formulate the rasterized image which is then fed over the network to the print engine. Job parallelism increases the flexibility of the printing system by allowing slow jobs to be processed while quicker jobs are completed and printing. However, it can be easily appreciated that where the jobs require substantially different processing times, waits will necessarily occur and overall system efficiency will suffer.

A well known commercially available system exploiting page parallelism is Adobe® Extreme. In this system the data input for a print job is normalized into a PDF format and stored on disk. The PDF format is essentially page independent guaranteed and thus facilitates segregating the job into page units for page parallel processing. A "sequencer" processing node takes the PDF jobs off the disk and writes them back onto a disk again a page at a time as individual files, one file per page. Rasterizing image processing nodes (RIPs) then convert the files into a print-ready form acceptable by a print engine. It is important to note that in terms of processing efficiency, Adobe Extreme must hit the disk twice, thus slowing the system down, and that the RIP nodes can only process a file consisting of a single page. Of course, an entire job may be limited to one page, but for purposes of setting the stage for the subject invention, when a job is comprised of several pages, Adobe Extreme must sequence it to individual pages only.

Accordingly, in the continuing need for improving efficiency and speed in printing systems, there is a need for a system which is not limited to mere job or page parallelism and that can facilitate control and data flow of a print job to the printing system that will obviate multiple access to a storage disk for any single job. The subject invention satisfies these needs and thus overcomes the problems specified above, as well as others.

BRIEF SUMMARY

The subject invention comprises a unique implementation of parallelism for which we can find no satisfactory defined term, and thus functioning as our own lexicographer, we will refer to this concept as "chunk" parallelism. Chunk parallelism is an intermediate level of parallelism between job parallelism and page parallelism. A chunk is a collection of rasterized data consisting of at least one page and not more than one job. A chunk may be an integer number of pages less than an entire job but has a startup overhead occurring on a chunk basis as opposed to a per page basis.

The printing system of the subject invention comprises a printer, a plurality of processing nodes, each processing node being disposed for processing a portion of a print job into a printer dependant format, and a processing manager for spooling the print job into selectively sized chunks and assigning the chunks to selected ones of the nodes for parallel processing of the chunks by the processing nodes into the printer dependant format. The chunks are selectively sized from at least one page to an entire size of the print job in accordance with predetermined splitting factors for enhancing page processing efficiency. The splitting factors comprise either a threshold boundary of a number of bytes or a threshold boundary of a number of pages. An end of one of the chunks comprises a next page boundary subsequent to the crossing of one of the threshold boundaries. The threshold boundaries for the number of bytes and the threshold boundary for the number of pages are determined for tending to achieve an equal amount of processing work between the processing nodes per boundary, and keeping multiple processors busy on a given job, respectively.

In accordance with another aspect of the present invention, multiple PDLs are accommodated. Dependant upon a determination of the language of the print job, a plurality of language specific splitting processors are provided for effecting the splitting of the print job for the determined language, whereby the conversion of a plurality of print job languages into a single predetermined standard language is obviated.

In accordance with another more limited aspect of the present invention, the processing nodes comprise means for processing an assigned one of the chunks when the processing manager starts sending the assigned chunk to the respective processing node whereby waiting for receipt of the entire chunk before RIP processing starts is obviated.

In accordance with another more limited aspect of the present invention, the system comprises a supervisor processor for estimating the work time required to process a print job based upon selected data determined from the splitting of the print job and for load balancing the print jobs across the processing nodes.

A first particular advantage of the subject invention is parallel RIP node processing functionality with granularity ranging from page to job parallelism.

A second advantage is page/chunk parallel RIP node processing while accepting multiple languages as input without having first to convert such input languages to a common form, e.g., converting a PDL language to PDF and splitting PDF on page boundaries as per Adobe® Extreme. Omitting such conversion step enhances system efficiency and speed.

Yet another advantage is a memory management scheme where the most recently written portions of the memory buffers that are used both for input and output on the RIP nodes are written to disk when the buffers overflow, rather than the more common approach of least recently used memory buffer portions. Because the buffers are accessed in a first in-first out manner, system processing results in significantly less latency in accessing data.

Other advantages and benefits of the present invention will become apparent to those of ordinary skill in the art upon reading and understanding the following detailed description of the preferred embodiments.

DESCRIPTION OF THE PREFERRED EMBODIMENTS

While the present invention will hereinafter be described in connection with preferred embodiments thereof, it will be understood that it is not intended to limit the invention to those embodiments. On the contrary, it is intended to cover all alternatives, modifications and equivalents as may be included within the spirit and scope of the invention as defined in the appended claims.

Figure 3:
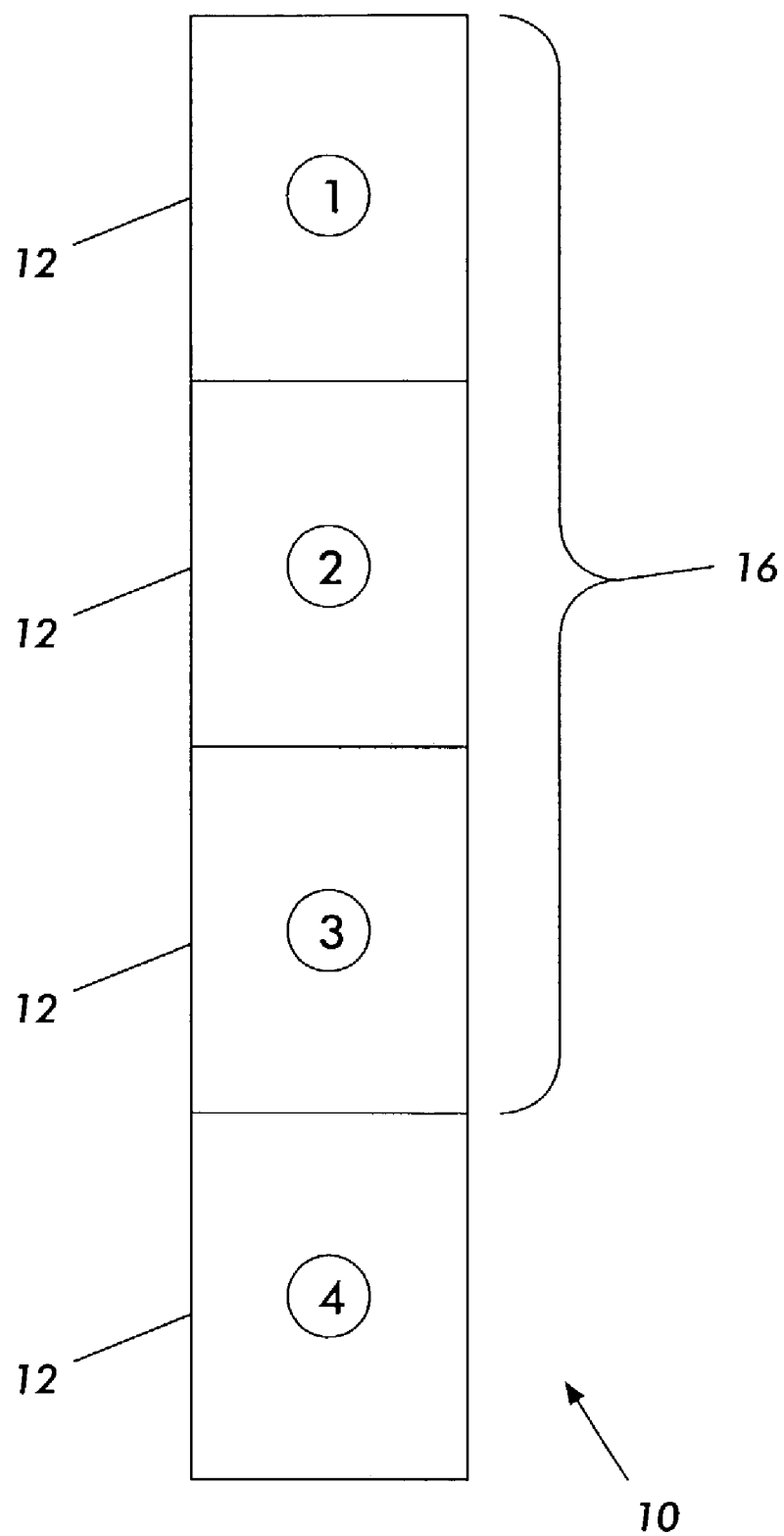
FIG. 3 is a schematic representation of a print job for showing page and possible chunk boundaries.

The present invention addresses the continuing need for faster printing systems—particularly systems where every page can be color and different. The system exploits parallelism to facilitate its speed, but especially an implementation of parallelism not known in prior art printing systems which had been limited to job parallelism or page parallelism. The subject invention uses an intermediate level of parallelism herein defined as "chunk" parallelism. A chunk of print job data is intended to comprise a collection of rasterizable data of at least one page and not more than one job. Job parallelism would occur when a job is smaller than the minimum chunk size, page parallelism occurs when the minimum chunk size is 0 (bytes/pages). With particular reference FIG. 3, it can be seen that a particular print job 10 is comprised of multiple pages 12 and several of the pages can be associated together into a "chunk" 16 for rasterizing by an assigned RIP node as will hereinafter be more fully explained. Prior art systems could only rasterize in a single node the entire job 10 or the pages 12 individually, but never an associated set of pages within a particular job.

The system includes a language identifier that selects the method by which the print job is split into chunks. For languages that permit it, the chunks' size is determined by estimating the amount of work. The trade off between small chunks/reduced job time and large chunks/improved throughput is managed by job priority. In addition to the language identifier, the system includes a splitter for each language supported; a collection of RIP nodes which translate the PDLs to print-ready form, preferably compressed; a collector that reorders chunk completion messages so that chunks appear to be completed in the same order they appeared in the original jobs; and, a supervisor process that estimates the time required to process a job based on statistics gathered in a splitting process and uses this to load balance the work across RIP nodes.

Basic Operation

Figure 1:
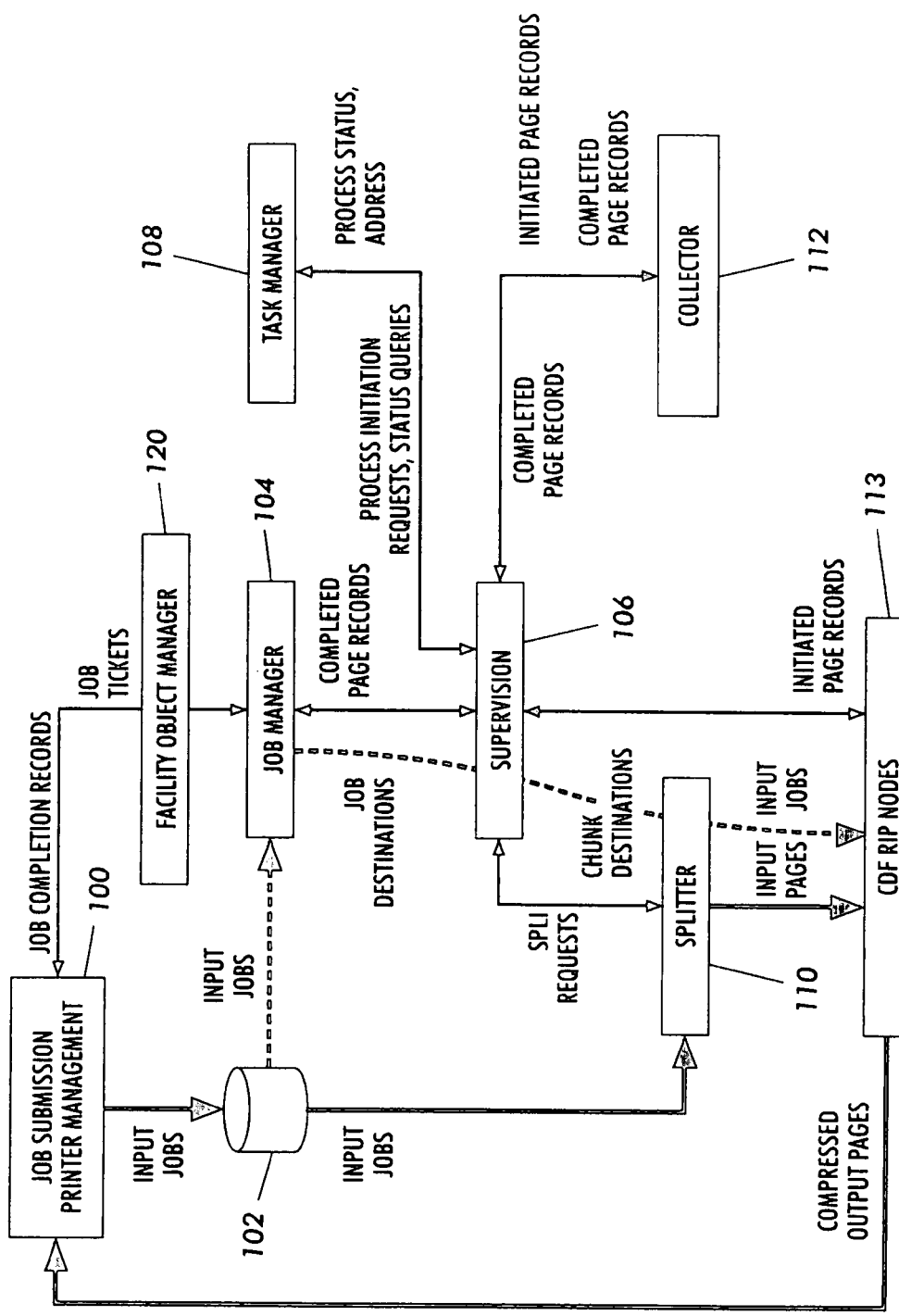
FIG. 1 is a block diagram illustrating the architecture for control and data flow of a printing system formed in accordance with the present invention.
Figure 2:
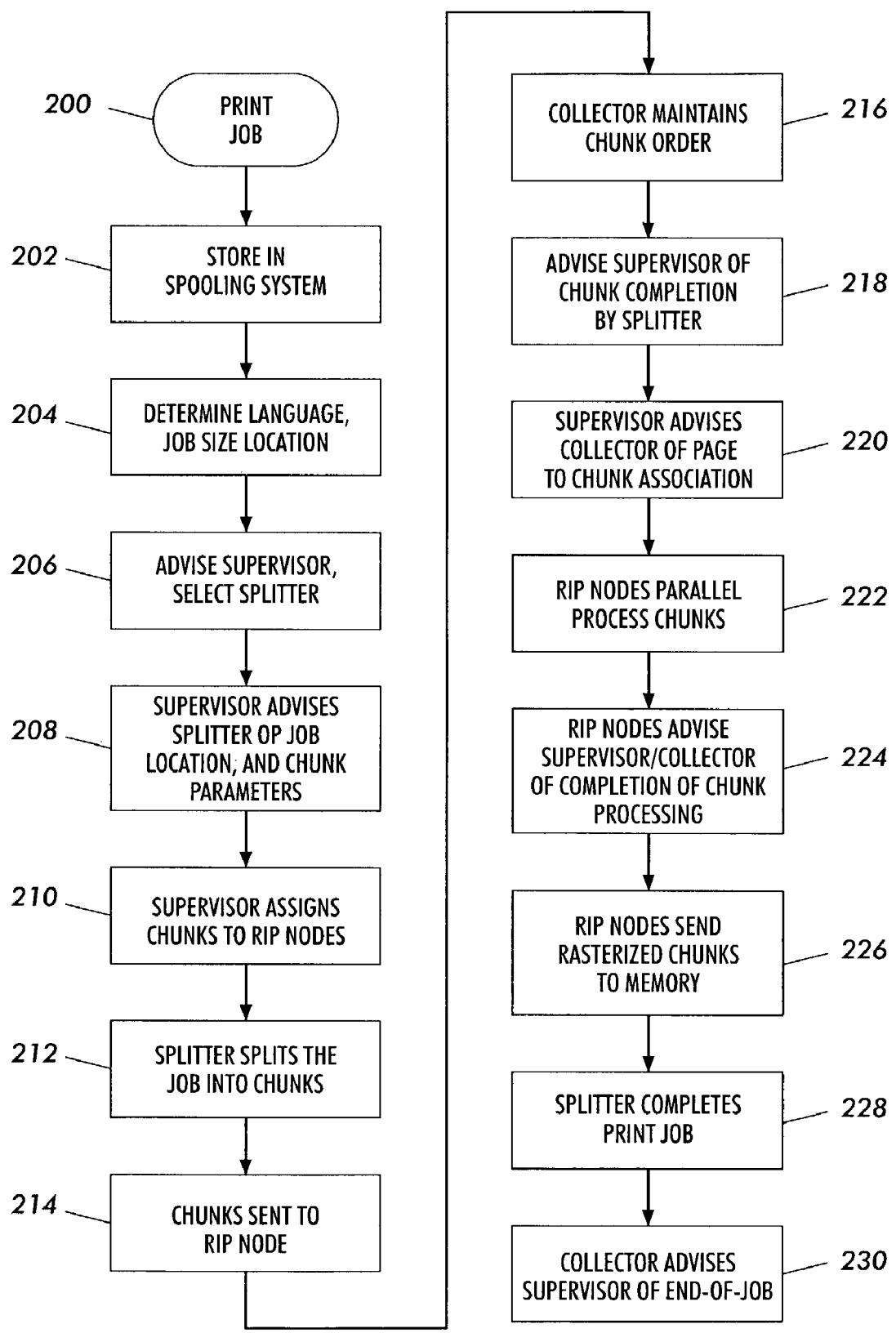
FIG. 2 is a flowchart summarizing a method for processing a print job in accordance with the present invention.

With particular references to FIGS. 1 and 2, the invention is comprised of several novel features, one of which is a chunk parallel page rasterization system. The system may be implemented as a distributed system, or a centralized service on a single multiprocessor machine, for driving a print engine (not shown).

The system architecture, control and data flow and processing steps comprise:

When a job 200 arrives from a client at job submission/printer management node 100, the input spooling system saves 202 the content either in memory or on disk 102, and the language is determined 204. Languages include PostScript, PDF, PPML, unstructured ASCII text, and others as needed.

The input spooling system 102 notifies 206 a processing manager assembly shown in FIG. 1 as Job Manager node 104, Supervisor node 106 and Task Manager node 108 for effecting the necessary supervisory functions, telling managing node 104 the language. The job size (if it has been fully received), and how/where to find the data is also determined 204. Any of several well-known mechanisms may be used to communicate the location of the data, including a network filename for a distributed system, or a memory address for a centralized system.

The supervisory node 106 selects 206 a splitter 110 using the determined language to select which splitter(s) is/are capable of splitting the job. A plurality of splitters is intended in a large system, in which case the supervisory function selects a splitter based on the estimated amount of pending work on all splitters' queues. The supervisor 106 also notifies the collector 112 that a new job exists in the system, and tells the spooling system 102 what the unique identifier for the new job is within the system. The supervisor generates unique identifiers so that it may communicate with multiple input spool systems without having their unique identifiers conflict.

The supervisory function then informs 208 the selected splitter 110 where to find the data (the supervisor does not look at the data), and the splitter may begin splitting the file as soon as it is ready. The splitter is multithreaded, so it can receive messages describing input jobs while it is splitting previous jobs. The supervisory function also informs 208 the splitter of the chunk parameters comprising the defining threshold boundaries of a chunk (minimum page count, minimum byte count).

The splitter 110 requests chunk destinations. The supervisor assigns 210 chunks to RIP nodes implementing a Common Decomposer Facility ("CDF") 113 using estimates of the amount of work pending on the nodes. (A CDF provides translation for PDL form to print-ready form). Estimates are calculated based on the total amount of work assigned to a physical RIP processor, as a given physical node may have both a RIP and a splitter running on them. The supervisor 106 only provides a small number (such as 3) of destinations to the splitter 110, to allow it to optimize its estimation of the amount of work assigned to each physical processor.

The splitter 110 splits 212 the job into chunks. At each page boundary the splitter checks to see whether the page count or byte count has been exceeded, and if either one has, it finishes that chunk. As it splits a job into chunks, it sends 214 the chunk to the next destination it has received from the supervisor. It writes the chunk into either a CDF memory or the disk associated with the node that the destination assigned by the supervisor indicates. In the preferred embodiment the data for a chunk is written into the memory, rather than disk. The splitter uses a separate thread to copy the data to the RIP node, so that it can continue splitting without being limited by network transfer time or the speed of the receiving node.

After the splitter writes the first page of a chunk, it notifies the supervisor, which, in turn, notifies the RIP node, and the collector 112. The collector maintains 216 a set of jobs in the system, and for each job, a list of chunks in order of arrival.

A RIP node has multiple threads or processes, one of which handles the receiving end of the data transfer. The splitter and the RIP node use some means of communicating, such as by sending a separate message, whether or not the splitter has completed 218 writing that chunk. Or the supervisor could send a message to the RIP node when it receives notification from the splitter node. When the RIP attempts to read beyond the end of the data written thus far, it blocks. If it attempts to read beyond the end of data written when the splitter has finished the chunk, it receives an end of file signal.

In a preferred embodiment data transfer uses an intermediary process, called VDISK (for virtual disk), which appears to both the sending and receiving processes like regular disk, with the ability to open files and directories, read and write files, etc. Unlike regular disk, VDISK provides the functionality that it may include a remote transfer (if the receiving process is on another node in a networked system), and because it knows whether the sending process has "closed" the file, it knows whether the receiving process should receive an end of file signal or be blocked on an attempt to read beyond the last data written. VDISK is implemented by a process providing memory shared with and the receiving process. The VDISK implementation provides for more data being written to VDISK than fits into memory by paging out blocks of data in a most-recently-used order, because the least recently used (written) pages will be needed (read) soonest. Other than providing a transparent networked file system interface, blocking reads before end of file, and most-recently-used paging, VDISK operates much like a conventional RAM disk.

When the splitter completes a chunk it sends a message to the supervisor informing it of which pages have been written; the supervisor informs 220 the collector of which pages to associate with a given chunk.

After the splitter has written several chunks, multiple parallel RIP nodes 113 operate 222 in parallel, writing pages of print ready data. Preferably this data is written 226 in compressed form, such as mixed raster content files, to internal memory data buffers (such as provided by VDISK).

As a RIP node completes a chunk, it sends 224 a message to the supervisor, which passes the message on to the collector 112. The collector notes that this chunk is complete, and as long as it finds the first in the list for this job is complete, it removes the first in the list, and informs the supervisor. The supervisor notifies the input spooling system of the location of the output data for that chunk.

When the splitter completes 228 a job, it informs the supervisor, which informs a collector to expect no more new chunks for that job.

When the collector receives the last message from the supervisor that a RIP node has completed a chunk, it knows it because that job has an associated end-of-job message, and the list of chunks becomes empty when that chunk is removed from the list. The collector then informs 230 the supervisor, which informs the input spooling system that the job is complete.

The compressed output pages for the completed output job are returned to printer management 100 for transmission to a print engine.

Parallelism is enhanced by the system architecture in that several of the processing nodes of FIG. 1 are intended to be multiple nodes acting in parallel. More particularly, such parallel processing nodes include Job Submission/Printer Management 100, Job Manager 104, Task Manager 108, Splitter 110 and CDF 113.

Chunk size is optimized to trade off individual job speed against throughput. The time that a RIP requires to process a chunk includes a small constant amount of startup time, as well as time that is generally proportional to the amount of data in the chunk. The constant of proportionality relating the amount of data to the processing time varies with the kind of document or documents being processed; however in a typical shop it only changes relatively slowly with time as the mix of jobs changes. If every chunk is one page long, the startup time is spent on every page, and the total processing time will include N times the startup time plus the time it takes to process all the pages. In a serial system the total processing time would be simply the startup time plus the time it takes to process all the pages. Clearly the throughput of the parallel system would be better with larger chunks. Contrariwise, if jobs are broken into very large chunks, the startup cost becomes negligible, however the chunks of any given job are likely to occupy only some of the RIP nodes. If there is only one job in the system, the remaining nodes are left idle. Even if there are multiple jobs in the system, the time between submission and completion of any one job is longer because the work is not well balanced across nodes. Considering the extreme case where chunks are as large as the jobs themselves, it is obvious that the time an individual job spends in the system is no faster than in a serial system.

Pages to be processed span a range of complexity. On typical systems, there is a factor of 20 or more between the processing time of the easiest pages and the hardest pages. The simplest predictor of page processing time is the number of bytes in a page. If the page is a hard page, the startup overhead for that page is very small compared to the total time spent on that page. If the page is an easy page, the startup overhead may be considerable compared to the time spent on that page. For this reason, the criterion for determining chunk size takes into account both total bytes and total page count. Easy pages are grouped together to make chunks that are large enough to keep the startup overhead down, but small enough to spread the job over multiple RIPs. Short, easy jobs may not be spread over multiple RIPs, but since they are short and easy, there is no need to accelerate them further.

For each type of input, splitting may be performed in a unique manner. One example is PDF, which comes in the form of a file containing multiple objects, along with a cross reference table indicating the locations of the objects. One type of object is the stream object, which contains all of the marking information—information pertaining to putting marks on paper. Another type is the indirect reference object, which is the equivalent of a pointer. Yet another is a dictionary, which provides a set of key-value pairs. By examining the information contained in a special dictionary, along with the information in the cross reference table, it is straightforward to find all of the objects in a file associated with each of its pages, and write out a separate PDF file for each of the pages. In a preferred embodiment, the splitter calculates some statistical information such as the sizes of the streams for each page, and passes that information to the supervisor for use in estimating the work associated with that page.

Another example is DSC-PS, Document Structuring Convention conformant PostScript. This format contains information needed for all pages at the beginning of a file, and then information specific to each individual page, in sequence thereafter. Some creation tools, such as QuarkXpress, mix information needed for later pages where only information specific to an individual page should appear, however it is possible to divide it into individual pages. Any splitter than can split a document into individual pages can readily concatenate several pages rather than using only one page per chunk, assuming it accepts an input format that supports multiple pages.

Some languages, such as database-mode VIPP (Variable Information Postscript Printware), are not readily split on page boundaries. In this case, a series of records comprise a job, and each record describes a single document, which may be several pages long. Typically this is intended for mass customized mailing, and each document within a job is intended to go in a separate envelope. For such a language, the splitter would divide the job at document boundaries.

The subject invention also comprises some other features.

Adaptive Scheduling

Splitters preferably collect statistical information about each page they split. For a PDF splitter, this includes the total size of the page, and how many bytes are in streams. It could also include data regarding the types of compression used for the streams (PDF streams are typically compressed), and the distribution of sizes. For a DSC-PS splitter it includes at least the creator name and the size in bytes of the page. If the creator explicitly indicates the number of bytes in images (via %% BeginData/%% EndData constructs) the number of bytes in images is included as a separate statistic. Another statistic could be the total number of pages for the split portion of the print job. This information is forwarded to the supervisor, which uses it to calculate an estimated time that it expects a RIP node to spend on that page or chunk. When a RIP completes a page, it informs the supervisor of how long it actually took. The supervisor uses the actual time along with the statistics to build a model of processing time as a function of the various statistical information it receives. As more RIPs complete more pages, more statistical information is available, and the model is refined. From this refined model, and knowledge of what work is already scheduled on each RIP node, the supervisor can predict how long a node will take until it is free to begin new work (i.e. work not yet scheduled for that RIP). The RIP expected to be available soonest will be the next one scheduled when a request for a destination from a splitter is satisfied. The supervisor only satisfies a small number of destination requests in advance, since the scheduled chunks that have no statistics yet associated with them only add uncertainty to the estimation. The statistics do not need to be collected from the same print job, i.e., from a prior portion of the same job.

Various approaches to building a model are possible. One possibility is a neural network. Another possible implementation is to divide the input pages into groups according to some subset of the statistical information, such as the creator (in the case of DSC-PS), or the distribution of stream sizes (for PDF), and then for each group calculate a linear model giving the RIP time as a function of one or more other statistics (such as the size of the page in bytes). Least squares estimation techniques (e.g. as found in the public domain package LAPACK) are satisfactory for constructing parameters of linear models.

Job Interrupt/Resume

When a job is interrupted, typically to let a higher priority job pass through the system, the supervisor informs the RIPs that they should not start on any new chunks for the current job. The RIPs may interrupt what they are doing and save state, but if the chunks are reasonably small, the higher priority job will be serviced soon enough if they complete the chunks they are currently processing. The supervisor stops all splitters currently operating by not satisfying their requests for destinations. This causes the splitters to pause. When the high priority job arrives (the reason for the interrupt), the supervisor sends it to a different splitter (already running, but paused because it had not received a source job), and provides it with destinations until it completes the job. The high priority job passes through the system with very little of the system needing to be aware that anything unusual is happening.

Priority Based Chunking

Throughput is maximized if there are always enough jobs in the input queue to keep all of the nodes busy operating on different jobs (effectively infinite chunk sizes). This is because there is some unavoidable overhead to splitting jobs into chunks. Individual job speed is maximized if every job is sent through with chunking parameters 0 (single page jobs only). This is because all of the nodes work on that job. A good compromise is to select chunking sizes that keep the overhead to 5 or 10 percent of the RIP time. This provides generally satisfactory job turnaround while having only a small impact on throughput. When a high priority job arrives, the chunk size is reduced to use single-page chunking, so that job passes through more quickly. This may be combined with Job Interrupt/Resume to provide even better response. The level of granularity may also be altered as a function of the system load: if all nodes are very busy, throughput is more important; if several nodes are idle a significant fraction of the time, a higher degree of parallelism may be achieved with finer grain chunking. The supervisor may alter the chunk size based on its knowledge of the amount of work scheduled for the various nodes, and the number and size of jobs waiting to be split.

Job Pipelined/Overlapped Processing

The queuing system stages jobs through a modified 'InProgress' stage. While normally only one job may be in progress, this permits multiple jobs to be in progress. Jobs enter the in progress stage as soon as their language has been identified, and are released to the parallel system immediately. They remain in the in progress stage until a) they are complete, and b) no earlier submitted jobs in the InProgress stage remain. If a job faults in any manner, the error is reported when the job leaves the InProgress stage. The parallel system (esp. the splitter) normally does not begin a job until the previous job has been split, however this is not a requirement, and in a large system with multiple splitters and many RIP nodes, multiple jobs may be split simultaneously. Overlapping the split stage of the next job with the RIP of pages of the previous provides a substantial improvement both in job time and in throughput over a pure page- or chunk parallel system. In an optional mode, the system may release jobs from the InProgress state as soon as they are complete, however this potentially violates the first-in-first-out behavior expected of a printing system, and may result in complications for the operator.

Auto-Discovery of Hardware Resources at Boot Time

Whenever the system is booted its initial operation is to check Parallel RIP eligibility. Two prerequisites must be satisfied to enable parallel RIP: a valid license must exist in conjunction with satisfying a minimum processor count, namely configuration file defined value minCPUs. If either of the prerequisites is not met, N-WAY—the limit to the number of active RIPs—is forced to one and parallel RIP is disabled. Also at boot time, and only if parallel RIP is enabled, the system checks the hardware, which in an SMP implementation means determining how many processors are installed, and how many compressor cards, how much memory and how much available swap. Given a system with n processors, experience has shown that the RIP rate increases linearly with the number of RIPs until the number of RIPs exceeds $\alpha$n, for some value of $\alpha$, dependent on the revision of the RIP software, and the nature of the job mix. Higher values for the number of RIPs tend to slow the system down (slightly) due to the burden of extra overhead (context switching, etc.) on a (CPU) bottlenecked system. The value of $\alpha$ used in the default setup is based on a set of masters anticipated to be typical of customer documents. This is used as one input to the calculation of the ideal RIP count, PreferredRIPConfig. The number of compressor cards has a similar effect as the number of processors on the ideal number of RIPs. Hence a second input to the calculation of PreferredRIPConfig is the number of compressor cards. The amount of memory available affects the maximum number of RIPs that may be active at a time without thrashing. This is used in determining the value of N-WAY, which is always greater than or equal to Preferred RIPConfig. The system determines values for N-WAY and Preferred RIPConfig, and uses them to determine MaxRIPs, which is the value of the number of parallel RIPs in actual operation. Specifically, if any or all of these values are already defined in a configuration file, it checks to see whether N-WAY and Preferred RIPConfig match the values just calculated, and if they do not, it changes the values in the file. Second, if MaxRIPs is defined, it checks to see whether it is less than N-WAY and if not, changes it to be equal to N-WAY. If MaxRIPs is not defined, it sets it to the value of PreferredRIPConfig.

Operator Interface to Above Features

At the Graphic User Interface (GUI), the operator is shown the three values (MaxRIPs, Preferred RIPConfig and N-WAY), and allowed to change the positive integer value of MaxRIPs to anything not greater than N-WAY. The GUI hides parallel RIP related parameters from the operator when parallel RIP is disabled (N-WAY equals one).

Auto-Recovery in Serial Mode

A substantial fraction of the jobs anticipated are coded in the PostScript language. Most of these jobs will either be Document Structuring Conventions conformant (or close enough for the purposes of this system), or sufficiently non-conformant that the non-conformance can be detected immediately. Some jobs will fool the system enough to pass through the splitter and fail during RIP. When a page being RIPped concurrently faults, all other pages in that job are purged from the system, a log message is written out in the error log for this job, and the job is sent to a single RIP without being split. This has the effect that the job is RIPped serially, while other jobs may pass through the system in parallel with it. If a page faults when a job is being RIPped serially, the job is faulted without re-try. Those jobs that fault after having already printed one or more pages are disqualified from auto-recovery.

Special Workflow to Enable Parallel RIP of Unprotected PostScript (PS) Jobs

Unprotected PS jobs operate in a special context in which any job may "permanently" alter the state of the interpreter's virtual memory in such a way as to affect "all" future jobs. Permanently and all are in quotes, because after a reboot or system crash virtual memory will always be reset to a known state, and because future jobs are also able to undo any effect that a virtual memory (VM)-changing job has. In a normal (i.e. not concurrent) system, unprotected jobs operate in their own context—that is, there is a queue for unprotected jobs, and these jobs use a separate UNIX process to RIP (separate from the RIP that runs protected jobs). The normal use of unprotected mode is to run a job that changes the state of VM and then to run one or more jobs that use the altered state of VM. The RIP process stays active across jobs; a protected RIP ensures that the state of VM is restored to its standard state after each job is run. To make this work in a page parallel system requires two things: a way of changing VM on all affected RIPs, and a mechanism for using this set of RIPs in parallel. This is implemented as two (mutually exclusive) user visible job attributes—Unprotected-Read-Write, and Unprotected-Read-Only. The implementation of Unprotected-Read-Only is exactly the same as that of protected page parallel: jobs are split and chunks are fed independently to multiple RIPS, to have their outputs collected and sequenced and sent to the printer. The only difference is that the Unprotected RIPs are used. Unprotected-Read-Write mode is implemented using Redundant-mode processing, in which the entire job is sent concurrently to all Unprotected RIPs, so that their VM state is set accordingly. A password is used to enforce VM write permissions for Unprotected-Read-Only, faulting any read-only job that tries to write to VM (this is the same mechanism used to enforce Read-only behavior in Protected queues). All RIPs finish any prior jobs before they switch to Redundant Mode. All RIPs save one have their output disabled. If the jobs produce any output, only one copy will be printed. In this way, the speed of Unprotected-Read-Write jobs is no slower than had they been sent to a serial system, and their output is identical; while the speed of Unprotected Read-Only jobs obtains the full benefit of parallelism.

Queue-Level Control Over Concurrent Processing

Because handling of PS jobs depends on DSC conformance, jobs from some sources may routinely fail. Users may control whether concurrency is used at the queue level. This control provides them the option of submitting jobs expected to fail if run parallel to a serial queue, so that they are guaranteed to run as well as on a serial system. This saves the time of potentially splitting the job and starting to RIP only to fail after the first few pages.

Handling Both Serial and Concurrent Chunks Simultaneously

When a job is tagged as serial (either from its queue parameters or due to retry), it only uses one RIP. The splitter continues to split additional jobs as it finds them in the queue(s) and remaining RIPs process the chunks belonging to the other jobs. This maximizes productivity. The alternative would be to have two modes and switch between them whenever a serial job starts or completes.

Flow Control Based on Available Buffer Space

Multiple jobs may be in the system at a time. For example, in a system with 10 RIPs, there could be three 2 page jobs in the system, as well as the last page of a 20 page job and the beginning of a subsequent job, all split at single page granularity. Depending on splitting parameters, there could be as many jobs as RIPs active, as well as arbitrarily many jobs being "split ahead". Every job in the system uses space in VDISK. At the least it uses space for its split chunks; there may also be pages completed out of order, or pages for jobs other than the first job due to be reported complete. Rather than have a fixed limit to the number of jobs in the system, the limit is based on the space left in VDISK. When VDISK fullness crosses a threshold, no new chunks may be created (the splitter is stalled). New jobs are added to the system only as the splitter finishes the ones it is already working on.

The described invention system includes both page parallel, for a variety of languages, and chunk parallel processing, with chunks consisting of one or more pages, but not more than a single job per chunk. Data is managed in a distributed system with minimal access to disk. In the preferred embodiment, jobs are pipelined which allows RIPs that complete early to begin the next job before difficult pages/chunks are complete. The level of granularity of parallelism is varied according to priority of a job and load of the system. Single jobs may pass quickly through the system, even if the system is heavily loaded, by splitting them at a fine grain and stopping other jobs from using resources. The system is scheduled based on intelligent estimates of the work required for upcoming jobs and jobs already in progress, and the parameters used to do the estimate are refined as the system runs.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

What is claimed:

1. A printing system comprising:
   (a) a printer;
   (b) a plurality of RIP processing nodes separate from the printer, each node being disposed for processing a portion of a print job into a printer dependent format; and,
   (c) a processing manager for splitting the print job into selectively sized chunks and for assigning the chunks to selected ones of the nodes for parallel processing of the chunks by the processing nodes into the printer dependent format, wherein the processed chunks are combined and submitted to the printer and the chunks are selectively sized from at least one page to the size of the entire print job in accordance with estimates of work time required to process the chunks for load balancing the print jobs across the RIP processing nodes for enhancing processing efficiency;
   wherein the processing manager includes means for adaptively scheduling processing node work load including means acquiring statistical results of performance by the processing nodes and for scheduling chunk processing assignment to one of the processing nodes based upon estimation of a completion of processing for the one node to be a next to finish processing node.

2. The system as defined in claim 1, wherein the predetermined splitting factors comprise one of a threshold boundary of a number of bytes or a threshold boundary of a number of pages.

3. The system as defined in claim 2, wherein an end of a selected one of the chunks comprises a next page boundary subsequent to the crossing of one of the threshold boundaries.

4. The system as defined in claim 2, wherein the threshold boundary for the number of bytes is determined for tending to an equal amount of work between the processing nodes per respective boundary.

5. The system as defined in claim 1, wherein the processing manager comprises a means for determining a language of the print job and a plurality of language specific splitting processors for effecting the splitting of the print job for the determined language.

6. The system as defined in claim 1, wherein the processing manager includes means for allowing the processing nodes to continue existing chunk processing for a first job in response to a job interrupt signal and preclude acquisition of additional chunks for processing of the first job until receipt of a resume signal.

7. The system as defined in claim 1, wherein an overhead is associated with a chunk at the splitting and the selectively sized chunks are split by the processing manager for keeping the overhead at about five to ten percent of the chunk processing time per processing node.

8. The system as defined in claim 1, wherein the processing manager includes means for overlapped processing of a plurality of jobs comprising means for splitting a next job during the processing by the processing nodes of chunks of a precedent job.

9. The system as defined in claim 1, wherein the printing system comprises a multiprocessor-based system.

10. A method of operating a printing system for parallel processing a print job with a plurality of RIP processing nodes separate from the printer into a printer-ready format for the printing of a print job comprising:
    (a) splitting the print job into a plurality of chunks, wherein the chunks are selectively sized from at least one page to the size of the complete print job in accordance with predetermined time estimates for processing the chunks respectively;
    (b) assigning the job chunks to respective ones of the RIP processing nodes and load balancing the processing of the chunks into the printer-ready format for minimizing overall processing time of the print job; and,
    (c) combining the processed chunks and submitting to the printer;
    wherein the splitting comprises adaptively scheduling work load between the processing nodes by acquiring statistical results of performance by the processing nodes and scheduling job chunk assignment to the processing nodes based upon estimating a completion of processing for a particular one of the processing nodes to be a next to finish processing of an assigned job chunk.

11. The method as defined in claim 10, wherein the splitting in accordance with the predetermined splitting factors comprises the forming of the job chunks to optimize job chunk size to trade off individual job speed against throughput.

12. The method as defined in claim 10, wherein the forming of the job chunks to optimize job chunk size comprises considering total bytes and total page count for the print job.

13. The method as defined in claim 12, wherein an overhead is associated with each job chunk at the splitting and the splitting comprises keeping the overhead at about five to ten per percent of a processing time for each job chunk per processing node.

14. The method as defined in claim 12, wherein the forming of the job chunks comprises determining a threshold boundary of a number of bytes or a threshold boundary of a number of pages.

15. The method as defined in claim 14, wherein the forming of the job chunks comprises setting an end of a job chunk at a next page boundary subsequent to the crossing of one of the threshold boundaries.

16. The method as defined in claim 14, wherein the threshold boundary of the number of bytes is determined so that the splitting comprises tending to an equal amount of work between the processing nodes for the plurality of job chunks.

17. The method as defined in claim 10, wherein the printing system includes a processing manager and a plurality of language specific splitting processors, and the method further comprises determining a language of the print job and the splitting of the print job by a one of the plurality of language specific splitting processors corresponding to the determined language.

18. The method as defined in claim 10, comprising the processing of an assigned job chunk by the processing nodes still continuing after receipt of a job interrupt signal and then stopping acquiring additional job chunks by the processing nodes until receipt of a resume signal.

19. The method as defined in claim 10, wherein the splitting comprises splitting a next job during the processing by the processing nodes of the job chunks of a precedent job.

* * * * *